(12) United States Patent
Dhua et al.

(10) Patent No.: US 8,332,419 B1
(45) Date of Patent: Dec. 11, 2012

(54) CONTENT COLLECTION SEARCH WITH ROBUST CONTENT MATCHING

(75) Inventors: Arnab S. Dhua, Sunnyvale, CA (US); Sunil Ramesh, San Jose, CA (US); Max Delgadillo, Salinas, CA (US); Raghavan Manmatha, Belchertown, MA (US)

(73) Assignee: A9.com, Palo Alto, CA (US)

( * ) Notice: Subject to any disclaimer, the term of this patent is extended or adjusted under 35 U.S.C. 154(b) by 237 days.

(21) Appl. No.: 12/779,254

(22) Filed: May 13, 2010

(51) Int. Cl.
*G06F 7/00* (2006.01)
*G06F 17/00* (2006.01)

(52) U.S. Cl. .................... 707/758; 707/769; 707/780

(58) Field of Classification Search .................. None
See application file for complete search history.

(56) References Cited

U.S. PATENT DOCUMENTS

| | | | | |
|---|---|---|---|---|
| 5,911,139 | A * | 6/1999 | Jain et al. | 1/1 |
| 2008/0215630 | A1* | 9/2008 | Oosawa et al. | 707/104.1 |
| 2009/0187558 | A1* | 7/2009 | McDonald | 707/5 |

OTHER PUBLICATIONS

Derpanis, K.G., "The Harris Corner Detector," located at <http://www.cse.yorku.ca/~kosta/CompVis_Notes/harris_Detector.pdf>, Oct. 27, 2004, 2 pages.
Harris, C. et al., "A Combined Corner and Edge Detector," Plessey Research Roke Manor, United Kingdom, The Plessey Company plc., 1988, 5 pages.
Lowe, D.G., "Object Recognition from Local Scale-Invariant Features," *Proc. of the International Conference on Computer Vision,* Sep. 1999, pp. 1-8.
U.S. Appl. No. 12/319,992, filed Jan. 14, 2009, for Mark A. Ruzon et al.

* cited by examiner

*Primary Examiner* — Jay Morrison
(74) *Attorney, Agent, or Firm* — Novak Druce + Quigg LLP

(57) ABSTRACT

False positive match rates between query content and content in a collection may be reduced with a minimum content region test and/or a minimum features per scale test. The quality of correlations between query descriptors and content descriptors may be improved with a modified sub-region descriptor construction. Content regions associated with detected content features may be partitioned into disjoint sets of sub-regions that cover the content regions, the sub-regions modified so as to at least partially overlap, and descriptor components generated for the modified sub-regions. Matching of feature-sparse content may be improved by adding blurred versions to the collection.

20 Claims, 11 Drawing Sheets

CONTENT COLLECTION SEARCH WITH ROBUST CONTENT MATCHING

BACKGROUND

It has become commonplace to use computers to search large collections of content. Moreover, the types of searchable content are becoming more diverse. While search practices for various types of content have become established, search practices for some types of content can be inefficient, fragile and/or otherwise unsatisfactory. For example, it is not uncommon to search for interesting portions of a text document by specifying a string of alphanumeric characters. However, an attempt to search a collection of images by specifying a string of alphanumeric characters can have unsatisfactory results. Searching a collection of content by specifying query content (e.g., searching the collection of images by specifying a query image) can resolve some issues, but it can also raise new issues.

For example, query content creation can be an issue. Alphanumeric query strings can be specified using a standardized keyboard, but query images may be created under a wide variety of conditions (e.g., distance, angle, lighting, focus, digital resolution) that affect query image quality. As content types become richer, the usefulness of exact matches can decrease. However, the use of inexact matching allows for false positive matches, and the use of low quality query content can raise the false positive match rate to a problematic level.

Some aspects of query content quality can result in failure to find a match, even when a useful match exists and the query content is of relatively high quality. For example, a search facility may fail to find a match for a relatively high quality digital photograph of an object, even where the collection of content includes images of the object, if the query image is taken from a perspective too dissimilar from the images in the collection. As another example, the object may have relatively few distinguishing features, so that even relatively slight flaws in query content quality can be problematic.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
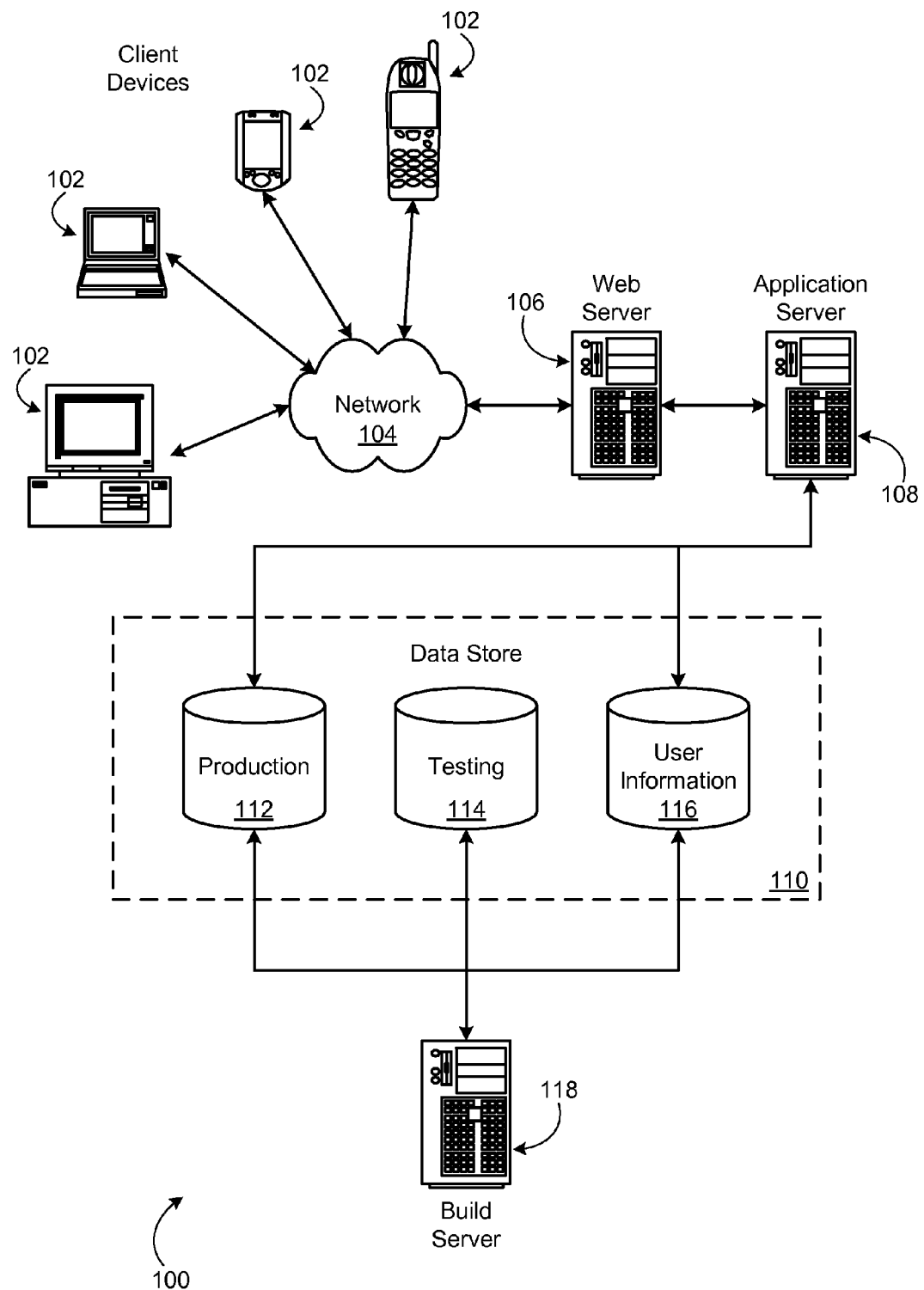
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, content collection search with robust content matching is enabled. Content such as documents, images and electronic records in a collection may be characterized using a set of content descriptors. Query content provided by a user of a search facility, for example, can be characterized using a set of query descriptors. Query content can be of any suitable type that is matchable to content in the collection. In at least one embodiment, query descriptors can be generated for query content using a same or similar process by which characterizing content descriptors are generated for the content in the collection. The set of query descriptors can be correlated with a subset of the set of content descriptors. For example, the content descriptors can be vectors in a vector space, and the subset of those content descriptors can be those content descriptors that are near the query descriptors in the vector space. Such correlation can allow for useful, although inexact, matches between query content and content in the collection.

In at least one embodiment, a false positive match rate between query content and content in the collection can be reduced using an appropriate test, such as a minimum content region test. In at least one embodiment, content descriptors can correspond to regions of content. For example, a particular content descriptor can characterize a particular set of pixels or a "patch" of an image. Accordingly, having correlated a particular subset of the query descriptors with a particular subset of the content descriptors for a candidate content piece (a "candidate subset"), corresponding regions ("candidate regions") of the candidate content piece and the query content can be determined. The candidate content piece can be identified as matching, in at least one embodiment, when the candidate region of the candidate content piece and/or the candidate region of the query descriptor has a proportionate size meeting or exceeding a specified minimum.

Alternatively, or in addition, the false positive match rate between query content and content in the collection can be reduced using a test such as a minimum features per scale test. The content descriptors can characterize content at a plurality of different scales. For example, the content descriptors can characterize features of the content at a smallest scale ("smallest scale features"), a larger scale ("larger scale features"), a largest scale ("largest scale features"), as well as several intermediate scales ("intermediate scale features"). Various other types of scales of different levels can be used as well as should be apparent. Descriptor proportion quotas can be specified for one or more of the scales, and the candidate content piece can be identified as matching the query content when each proportion quota is met by the candidate subset of the content descriptors and/or the correlated subset of the query descriptors.

A process of correlating the set of query descriptors with the subset of content descriptors can depend, in at least one embodiment, on a nature and/or construction of the descriptors. In at least one embodiment, correlation quality can be improved using a modified sub-region descriptor construction. Content features can be identified for at least a portion of the plurality of scales, and regions associated with the identified features can be correlated with sizes depending at least in part on the scale. Each region can be partitioned into a disjoint set of sub-regions. One or more of the sub-regions can be expanded and/or contracted in accordance with a pattern, for example, depending on the type of content. A content descriptor for the region can be constructed from content descriptor components determined for each sub-region. For example, the content descriptor can be a vector and the content descriptor components can be vector co-ordinates.

The content collection may include content that is simple and/or has relatively few features (is "feature-sparse"). For example, the content collection may include images such as icons and logos that have relatively few visual features. In at least one embodiment, matching of feature-sparse content can be improved by adding a set of blurred versions of the feature-sparse content to the collection. For example, a set of image blur transformations can be applied to feature-sparse images such as icons and logos to create blurred versions of the images. Sets of content descriptors generated for blurred versions of content may differ significantly from the set of content descriptors generated for the original, and may enable matching with relatively low quality query content. Addition of blurred versions of feature-sparse content to the content collection may, in effect, provide additional features for the feature-sparse content, thus making matching easier.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a build portion (or side) and a production portion. The production portion may include one or more electronic client devices such as the client devices 102 depicted in FIG. 1. The client devices 102 may include any appropriate device operable to send and receive requests, messages, or information over an appropriate network 104 and convey information back to a user of the client devices 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client devices 102, and may even handle a majority of the data access and business logic for an application.

The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client devices 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a build side designed to service the data store 110 rather than to service requests from the client devices 102. The build side of the environment 100 may include a development server 118, which can have functionality similar to the application server 108. In at least one embodiment, the application server 108 may also function as a build server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or build server 118, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on one of the client devices 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
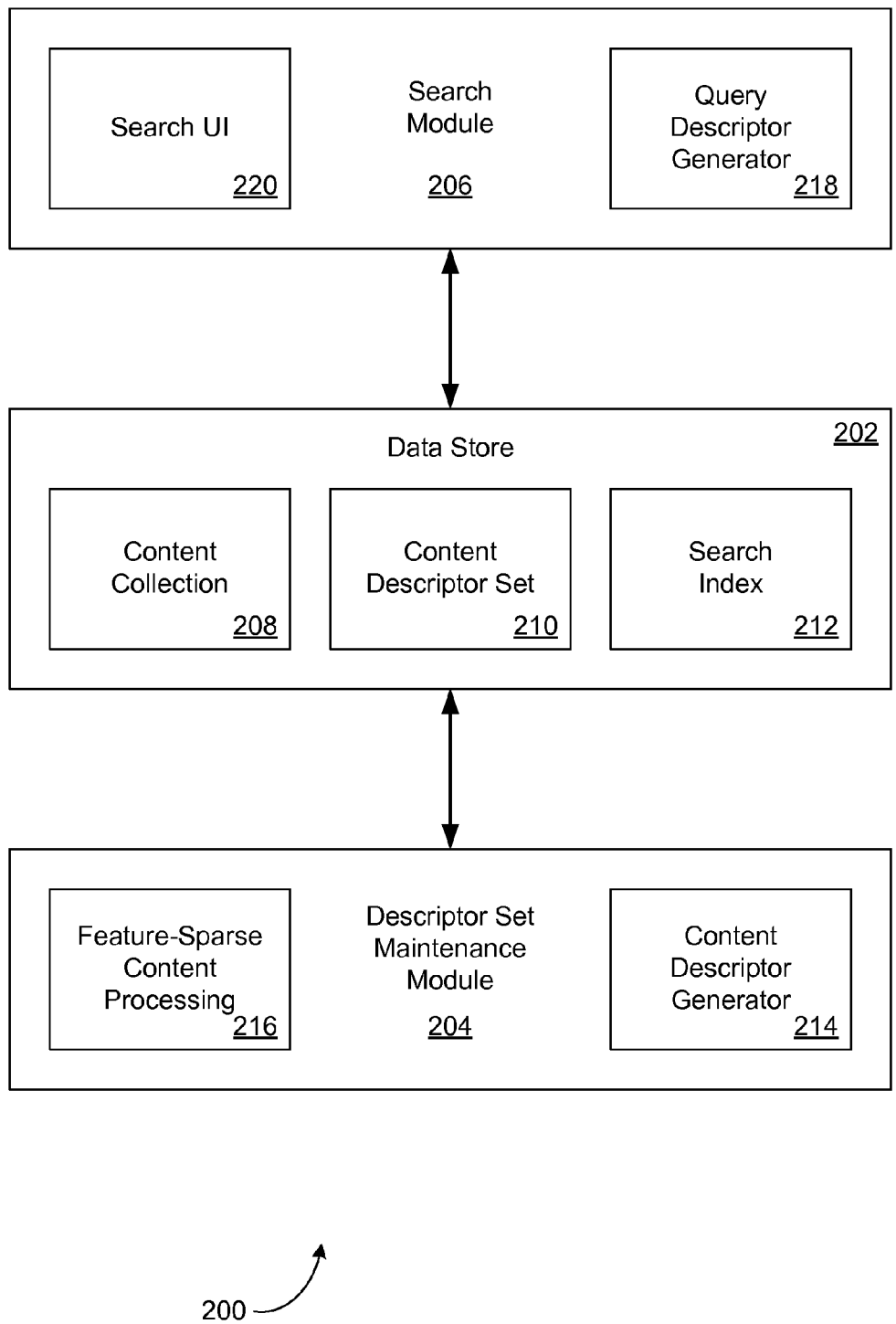
FIG. 2 is a schematic diagram depicting aspects of an example computerized system in accordance with at least one embodiment.

FIG. 2 depicts aspects of an example computerized system 200 configured to facilitate search in accordance with at least one embodiment. The example system 200 includes at least one data store 202, a descriptor set maintenance module 204, and a search module 206. The data store 202 may include a content collection 208, a content descriptor set 210 characterizing the content collection 208, and a search index 212 indexing the content descriptor set 210 and thereby the content collection 210. The descriptor set maintenance module 204 can include a content descriptor generator 214 configured to generate content descriptors for the content descriptor set 210 based on content in the content collection 208, and a feature-sparse content processing module 216 configured to generate additional versions of feature-sparse content in the content collection 208.

The search module can include a query descriptor generator 218 configured to generate query descriptors for query content, and a search user interface (UI) module 220 configured to facilitate user interaction with the system 200. The arrows between the modules 202, 204, 206 in FIG. 2 indicate that the modules 202, 204, 206 are communicatively coupled, for example, by a communication network within a computer and/or between a plurality of computers such as the servers 106, 108, 118 of FIG. 1. For example, the search module 206 may be hosted and/or implemented at least in part by the application server 108, the data store 202 may incorporate and/or be incorporated at least in part by the data store 110, and the index maintenance module 204 may be hosted and/or implemented at least in part by the build server 118.

The content collection 208 may include any suitable content. Examples of suitable content include electronic records, data structures, data objects, representations including representations of goods such as physical goods and commercial goods and representations of services such as commercial services, document collections, images including digital images in any suitable image format, audio, video, virtual environments including virtual realities (VR) and recordings thereof, and suitable combinations thereof. Examples of suitable image formats include digital image formats such as raster formats including bitmaps (e.g., BMP), compressed images in accordance with a Joint Photographic Experts Group (JPEG) standard, graphics interchange formats (e.g., GIF), and portable network graphics formats (e.g., PNG), as well as vector formats such as computer graphics metafile formats (e.g., CGM) and scalable vector graphics formats (e.g., SVG).

Each content piece in the content collection 208 may be characterized by one or more of the content descriptors set 210. Any suitable type of content descriptor may be utilized to describe content in the content collection 208. Examples of suitable types of content descriptor include metrizable content descriptors such as feature vectors having co-ordinates that correspond to one or more content features. Examples of suitable feature vectors include scale-invariant feature vectors such as the "SIFT keys" described in David G. Lowe, "Object Recognition from Local Scale-Invariant Features," Proceedings of the International Conference on Computer Vision, September, 1999. The search index 212 may index the content descriptor set 210 for fast matching with query descriptors generated by the query descriptor generator 218. The search index 212 may include any suitable data indexing structure.

The search UI module 220 may provide information from the search module 206 for presentation. For example, the search UI module 220 may generate a search user interface (UI) presentation specification and provide the specification to any of the client devices 102 (FIG. 1) through the network 104. The search UI module 220 may specify the search UI presentation with any suitable presentation specification language including suitable hypertext markup languages (e.g., HTML) and suitable programming and/or scripting languages (e.g., JavaScript). The search UI module 220 may receive information responsive to the search UI presentation. For example, the search UI module 220 may receive search requests including query content from any of the client devices 102. The search UI module 220 may process received requests and activate associated search module 206 functionality in response.

The search module 206 may receive query content, for example, from the search UI module 220. The query content may be of any type included in the content collection 208 and/or for which query descriptors suitable for comparison with the content descriptor set 210 may be generated. The search module 206 may utilize the query descriptor generator 218 to generate a set of query descriptors characterizing the query content. For example, the query descriptor generator 218 may generate the set of query descriptors in a same and/or similar manner that content descriptors are generated for the content descriptor set 210 by the content descriptor generator 214. The search module 206 may determine a subset of the content descriptor set 210 that is nearest the set of query descriptors, for example, nearest with respect to a specified metric and/or as specified by the search index 212.

Figure 3:
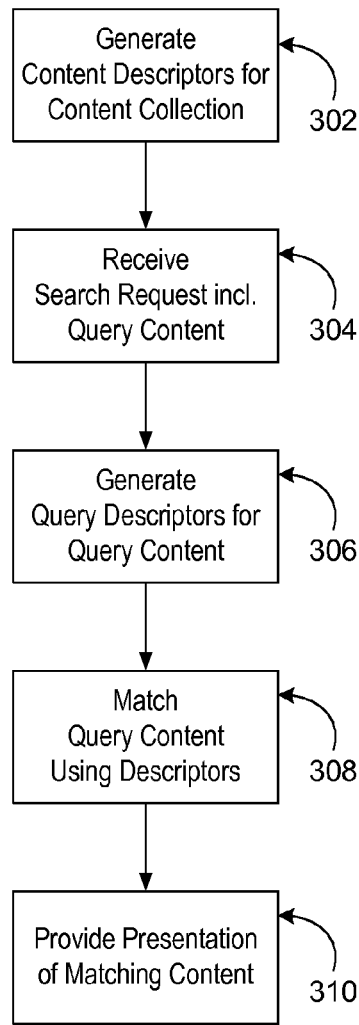
FIG. 3 is a flowchart depicting example steps for searching a content collection in accordance with at least one embodiment.

The description now turns to example procedures that may be performed by the system 200 in accordance with at least one embodiment. FIG. 3 depicts example steps for searching the content collection 208 of FIG. 2 in accordance with at least one embodiment. At step 302, the content descriptor set

210 characterizing the content collection 208 may be generated. For example, the content descriptor set 210 may be generated by the descriptor set maintenance module 204 as described below in more detail with respect to FIGS. 4-9.

At step 304, a search request including query content may be received. Client devices 102 of FIG. 1 may capture, generate and/or create the query content and submit the query content to the search module 206 of FIG. 2 with a user interface facilitated by the search UI module 220. For example, client devices 102 may include a digital camera, and may utilize the digital camera to generate a query image to submit to the search module 206. At step 306, a set of query descriptors may be generated for the query content. For example, the search module 206 may generate the set of query descriptors with the query descriptor generator 218 as described below in more detail with respect to FIGS. 4-9.

At step 308, the query content may be matched to a subset of the content collection 208 of FIG. 2. For example, the search module 206 may correlate the set of query descriptors with a subset of the content descriptor set 210, and the subset of the content collection 208 matching the query content (the "matching subset" of the content collection 208) may be selected based on the subset of the content descriptor set 210 correlated with the set of query descriptors. Example matching procedures in accordance with at least one embodiment are described below in more detail. At step 310, a presentation of the matching subset may be provided. For example, the search UI module 220 may specify and provide the presentation to one of the client devices 102 of FIG. 1 responsive to the search request received at step 304.

Figure 4:
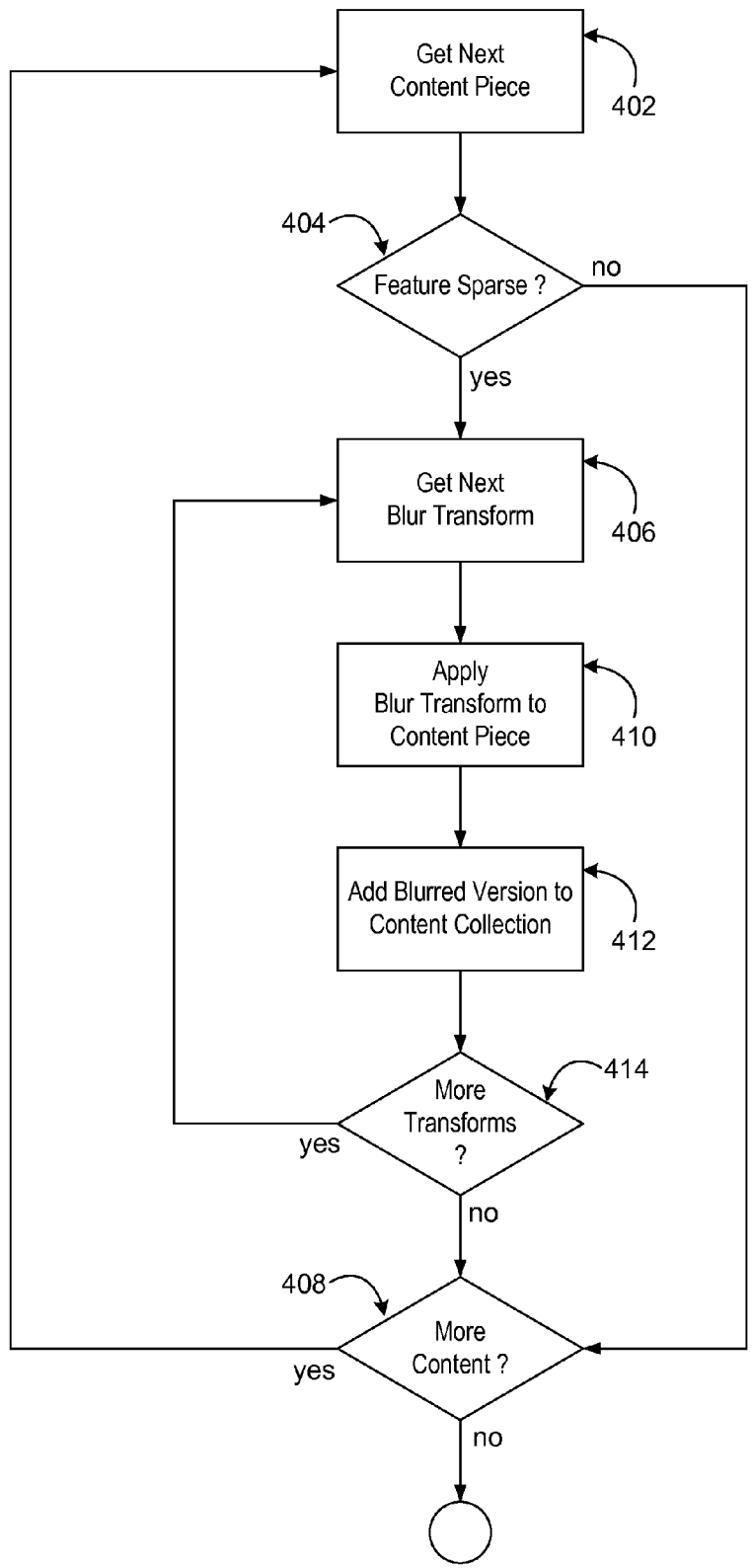
FIG. 4 is a flowchart depicting example steps for facilitating feature-sparse content matching in accordance with at least one embodiment.

As part of content descriptor set 210 (FIG. 2) generation, the descriptor set maintenance module 204 may detect feature-sparse content in the content collection 208, and add blurred versions of the feature-sparse content to the content collection 208 to improve matching with query content. FIG. 4 depicts example steps for facilitating feature-sparse content matching in accordance with at least one embodiment. At step 402, a next (e.g., a first) content piece may be selected. For example, the descriptor set maintenance module 204 may select the next content piece for feature-sparse checking from the content collection 208.

At step 404, it may be determined whether the selected content piece is feature-sparse. For example, the descriptor set maintenance module 204 (FIG. 2) may generate a set of content descriptors for the content piece with the content descriptor generator 214, and determine that the content piece is feature-sparse when a number of content descriptors in the generated set is less than a feature-sparse threshold. If the selected content piece is determined to be feature-sparse, a procedure incorporating step 404 may progress to step 406. Otherwise, the procedure may progress to step 408.

The feature-sparse content processing module 216 (FIG. 2) may maintain a set of blur transforms. Content in the content collection 208 may be associated with one or more intensity gradients (e.g., corresponding to differences in values of matrix entries), and blur transforms in the set may modify the intensity gradient(s), for example, reduce the intensity gradient(s). Blur transforms in the set may include suitable conventional blur transforms ("basic blur transforms"), as well as combinations and/or sequences of basic blur transforms. Blur transforms in the set may have one or more blur transform parameters, and different instances of a same blur transform type in the set may be configured with different blur transform parameter values.

For example, the set of blur transforms may include one or more Gaussian blur transforms and one or more unsharp mask transforms for feature-sparse images in the content collection 208 (FIG. 2), that is, for images having relatively few visual features such as corners. The Gaussian blur transform(s) may have blur transform parameters such as blur radius and "sigma" (σ). The unsharp mask transform(s) may have similar blur transform parameters. The set of blur transforms may include different instances of the Gaussian blur transform and/or the unsharp mask transform configured with different blur transform parameter values. For example, the set of blur transforms may include a set of Gaussian blur transforms and/or a set of unsharp mask transforms with increasingly higher blur radius and/or sigma. The set of blur transforms may include one or more combinations and/or sequences of Gaussian blur transforms and unsharp mask transforms. For example, the set of blur transforms may include blur transforms that correspond to a Gaussian blur transform followed by an unsharp mask transform. In some conventional contexts, unsharp mask transforms may reduce content blur. In contrast, in at least one embodiment, the unsharp mask transform(s) may be utilized to vary content blur, for example, with respect to the unblurred content piece.

At step 406, a next (e.g., a first) one of the set of blur transforms may be selected. For example, the feature-sparse content processing module 216 (FIG. 2) may select the next of the set of blur transforms to apply to the content piece selected at step 402. At step 410, the selected blur transform may be applied to the content piece. For example, the feature-sparse content processing module 216 may apply the selected blur transform. Processes applying blur transforms to intensity gradients are well understood by those of skill in the art and need not be further detail here.

At step 412, the blurred version of the content piece may be added to the content collection 208 (FIG. 2). For example, the feature-sparse content processing module 216 may add the result of the blur transform applied to the content piece at step 410 to the content collection 208. At step 414, it may be determined whether to apply additional blur transforms. If so, the procedure may progress to step 406 to select the next blur transform to apply. Otherwise, the procedure may progress to step 408. At step 408, it may be determined whether there are more content pieces in the content collection 208 to be tested for feature-sparseness. If so, the procedure may progress to step 402. Otherwise, the procedure may progress to one or more steps not depicted in FIG. 4, for example, the procedure may progress to steps depicted in FIG. 5.

The steps 404, 406, 410, 412 and 414 of FIG. 4 are located within a content loop facilitated by steps 402 and 408. The content loop iterates through the content collection 208 (FIG. 2) so that each content piece in the content collection 208 may be checked for feature-sparseness. Part of step 412 may be configuring the blurred versions to reference the original content piece and/or another content piece referenced by the original. Alternatively, at step 412, the feature-sparse content processing module 216 may activate descriptor set maintenance module 204 functionality to generate content descriptors for the blurred version of the content piece. Then, the content descriptors for the blurred version may be added to the content descriptor set 210 for the original content piece. As a further alternative, content descriptors may be generated for the original and any blurred versions prior to the loop test of step 408.

Figure 5:
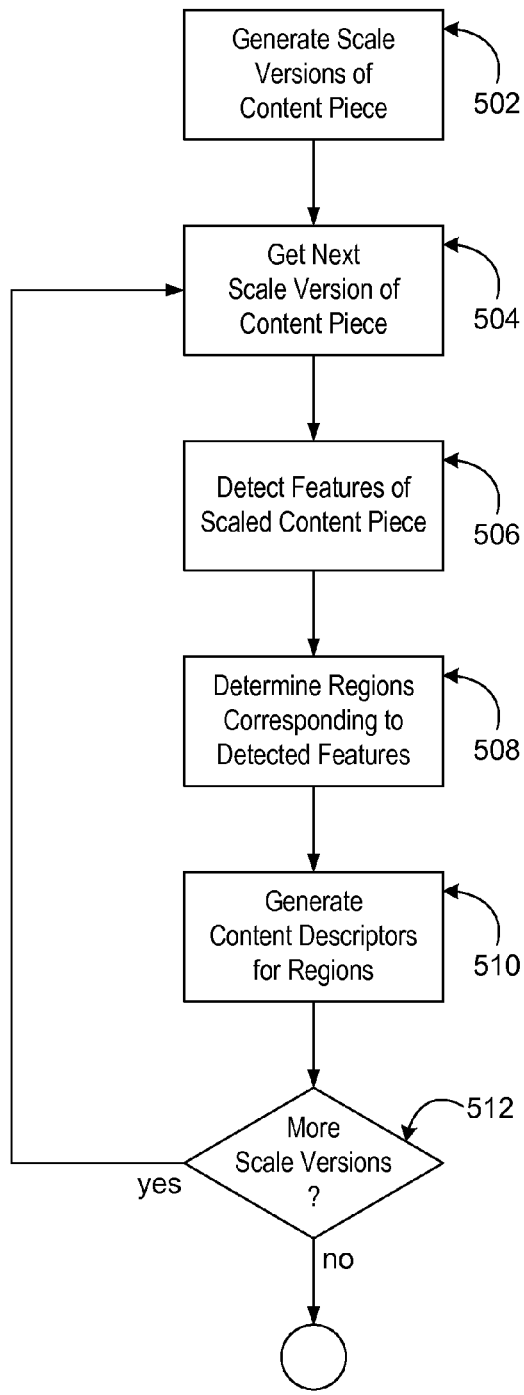
FIG. 5 is a flowchart depicting example steps for generating content descriptors in accordance with at least one embodiment.

FIG. 5 depicts example steps for generating content descriptors for a content piece in accordance with at least one embodiment. The steps of FIG. 5 may be performed in the context of a content loop such as the content loop facilitated by steps 402 and 408 of FIG. 4. At step 502, a set of scaled versions of the content piece may be generated. For example, the content descriptor generator 214 (FIG. 2) may maintain a set of scale transformations, and apply each of the set of scale transformations to the content piece to generate the set of scaled versions. The set of scale transformations may include downsampling transformations, smoothing transformations, and suitable combinations and/or sequences thereof. For example, the set of scale transformations may include conventional image downsampling and smoothing transformations such as Gaussian smoothing transformations for image content. The set of scale transformations may be applied progressively to the original content piece so that progressively larger scale features of the original content piece are emphasized later generated scaled versions. An example of scaled version set generation is described in Ruzon et al., "Method and System for Representing Image Patches," U.S. patent application Ser. No. 12/319,992 filed Jan. 14, 2009, (hereinafter "Ruzon et al.").

Figure 6:
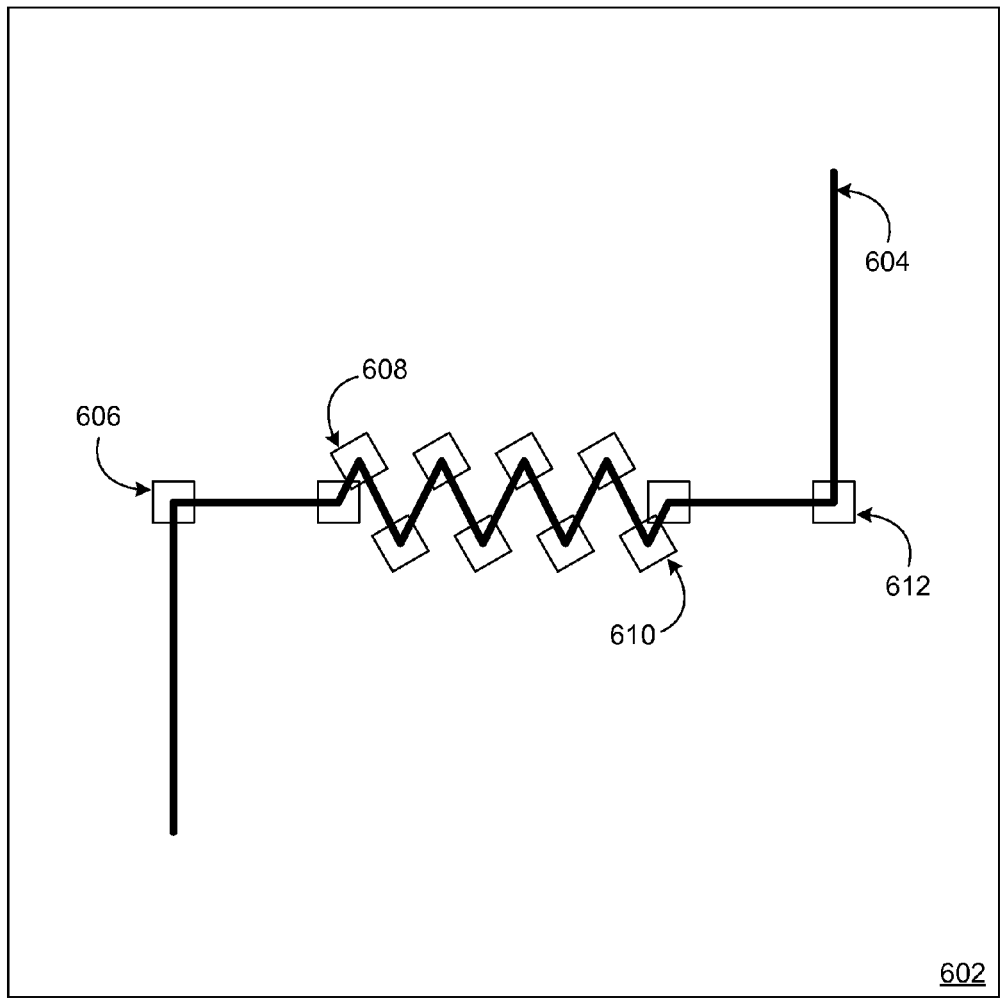
FIG. 6 is a schematic diagram depicting aspects of an example smaller scaled version of an image in accordance with at least one embodiment.
Figure 7:
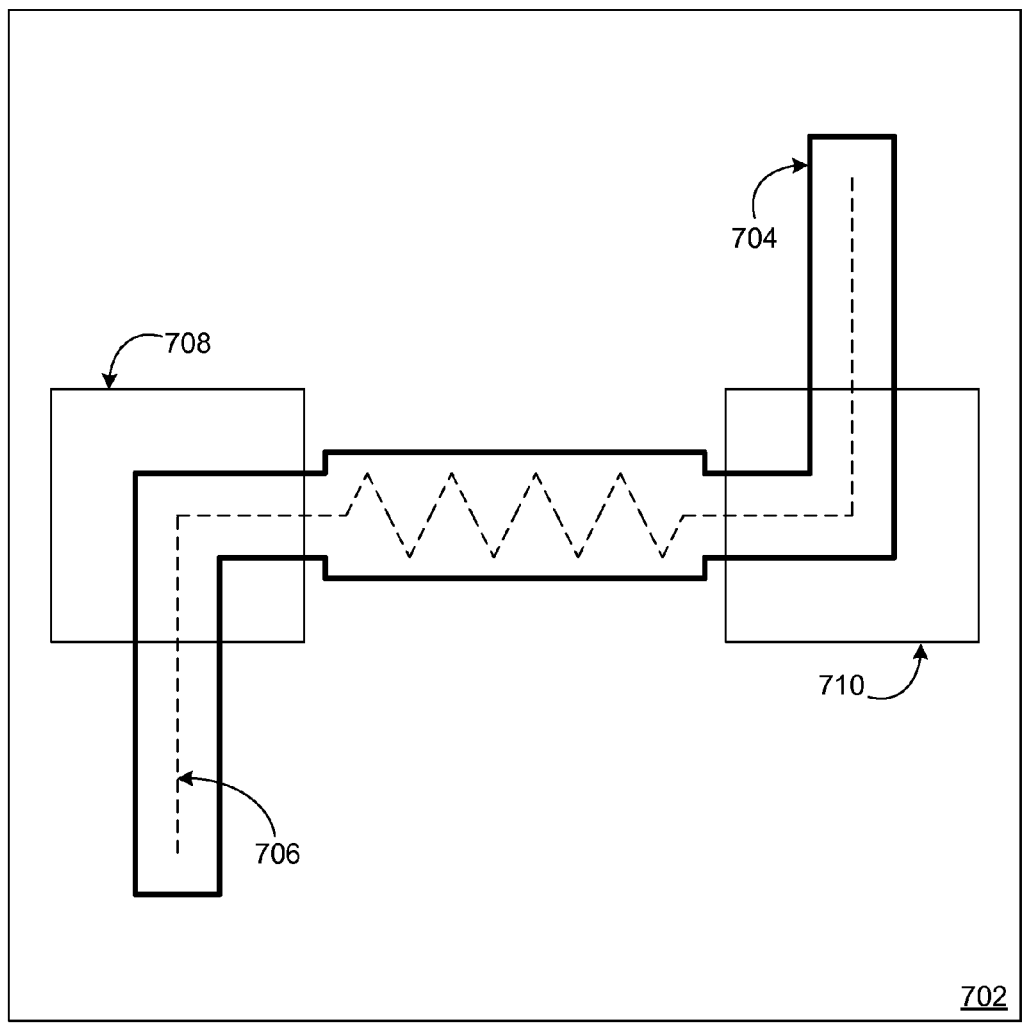
FIG. 7 is a schematic diagram depicting aspects of an example larger scaled version of the image in accordance with at least one embodiment.

FIG. 5 will be described with reference to example scaled versions of a content piece as depicted in FIG. 6 and FIG. 7. FIG. 6 depicts aspects of an example smaller scaled version of an example image 602 in accordance with at least one embodiment. The dark line 604 represents a set of pixels in a foreground of the image 602. The foreground pixel set 604 has visual features such as corners where the line formed by the pixel set 604 changes direction. The image 602 may be characterized by image patches centered on the visual features of the foreground pixel set 604. In FIG. 6, the image patches 606, 608, 610 and 612 are depicted as small squares centered on corners of the foreground pixel set 604.

FIG. 7 depicts aspects of an example larger scaled version 702 of the example image 602 in accordance with at least one embodiment. The scaled version 702 of the image 602 has been subject to one or more scale transformations. The dark line 704 represents a set of pixels in a foreground of the image 702. The dark line 704 encloses the set of pixels. The set of pixels 704 is a result of the set of pixels 604 being transformed by the scale transformation(s). The dashed line 706 corresponding to the set of pixels 604 is depicted in FIG. 7 for reference (including positional reference). The images 602 and 702 are examples of scaled versions of the content piece that may be generated at step 502. The larger depicted size for the regions 708 and 710 of FIG. 7 relative to regions such as regions 606, 608, 610 and 612 of FIG. 6 indicate that the regions 708 and 710 are larger, for example, that the regions 708 and 710 include more pixels of the image 602, 702.

Returning to FIG. 5, at step 504, a next (e.g., a first) of the scaled versions of the content piece generated at step 502 may be selected. For example, the content descriptor generator 214 (FIG. 2) may select the smaller scaled version of the image 602 (FIG. 6). At step 506, one or more features of the selected scaled version of the content piece may be detected. For example, the content descriptor generator 214 may detect a set of features of the image 602 such as a set of "corners" of the set of pixels 604. Any suitable feature detection technique may be utilized to detect the feature(s). Examples of suitable feature detection techniques include conventional image feature detection techniques such as Harris corner detection. An example of Harris corner detection is described in Harris et al., "A Combined Corner and Edge Detector," Proceedings of the 4th Alvey Vision Conference, August 1988.

At step 508, a set of regions (e.g., image patches) of the selected scaled version of the content piece may be determined. For example, the content descriptor generator 214 (FIG. 2) may determine a set of regions of the image 602 that correspond to the set of features detected at step 506. Using the example image 602 shown in FIG. 6, the features detected in image 602 include corners of the foreground pixel set 604, and the set of regions include corresponding regions such as the regions 606, 608, 610 and 612. At step 510, content descriptors may be generated for the set of regions determined at step 508. For example, the content descriptor generator 214 may generate a content descriptor for each determined region of the image 602. Generating a content descriptor for a region is described below in more detail with reference to FIG. 8.

At step 512, it may be determined whether there are more scaled versions of the content piece for which to generate content descriptors. If so, a procedure incorporating step 512 may progress to step 504. Otherwise, the procedure may progress to steps not depicted in FIG. 5, for example, the procedure may progress to step 304 of FIG. 3. For example, subsequent to the generation of content descriptors for the image 602, the scaled version 702 of the image 602 may be selected at step 504. It may be that just two corners of the set of pixels 704 are detected at step 506, and corresponding regions 708, 710 determined for the detected corners at step 508. At step 510, the content descriptor generator 214 (FIG. 2) may generate a content descriptor for each of the determined regions 708 and 710.

The descriptor set maintenance module 204 (FIG. 2) may update the content descriptor set 210 with the content descriptors generated by the steps of FIG. 5 at any suitable time. For example, the content descriptor set 210 may be updated following step 510. Alternatively, or in addition, the content descriptor set 210 may be updated following completion of the content loop, that is, once content descriptors have been determined for each content piece in the content collection. The descriptor set maintenance module 204 may maintain multiple versions of the content descriptor set 210. For example, the descriptor set maintenance module 204 may maintain a first version of the content descriptor set 210 utilized by the search module 206 to respond to search requests (a "live" version of the content descriptor set 210), and a second version of the content descriptor set 210 updated by the descriptor set maintenance module 204 that becomes the live version once the update is complete (an "update-in-progress" version of the content descriptor set 210).

In at least one embodiment, a content descriptor (and/or a "feature descriptor") may be generated for a region of content corresponding to a detected feature of the content at least in part by modifying a disjoint set of sub-regions that cover the region so that the sub-regions at least partially overlap. For example, the steps of FIG. 8 may be performed as part of step 510 of FIG. 5. At step 802, the region of content may be partitioned into a disjoint set of sub-regions. For example, the content descriptor generator 214 (FIG. 2) may partition one of the regions determined at step 508.

Figure 8:
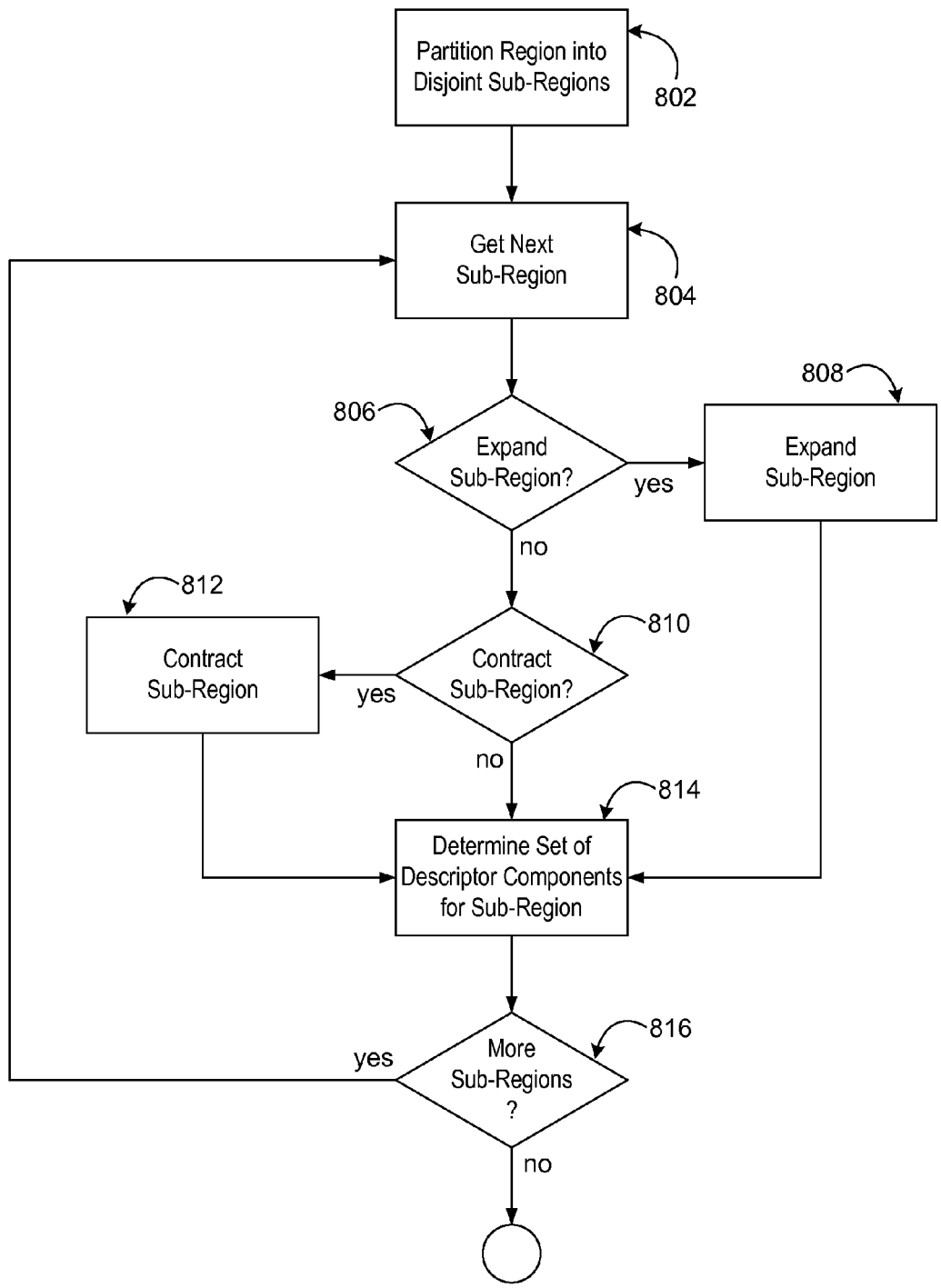
FIG. 8 is a flowchart depicting example steps for generating a content descriptor for a content region in accordance with at least one embodiment.
Figure 9:
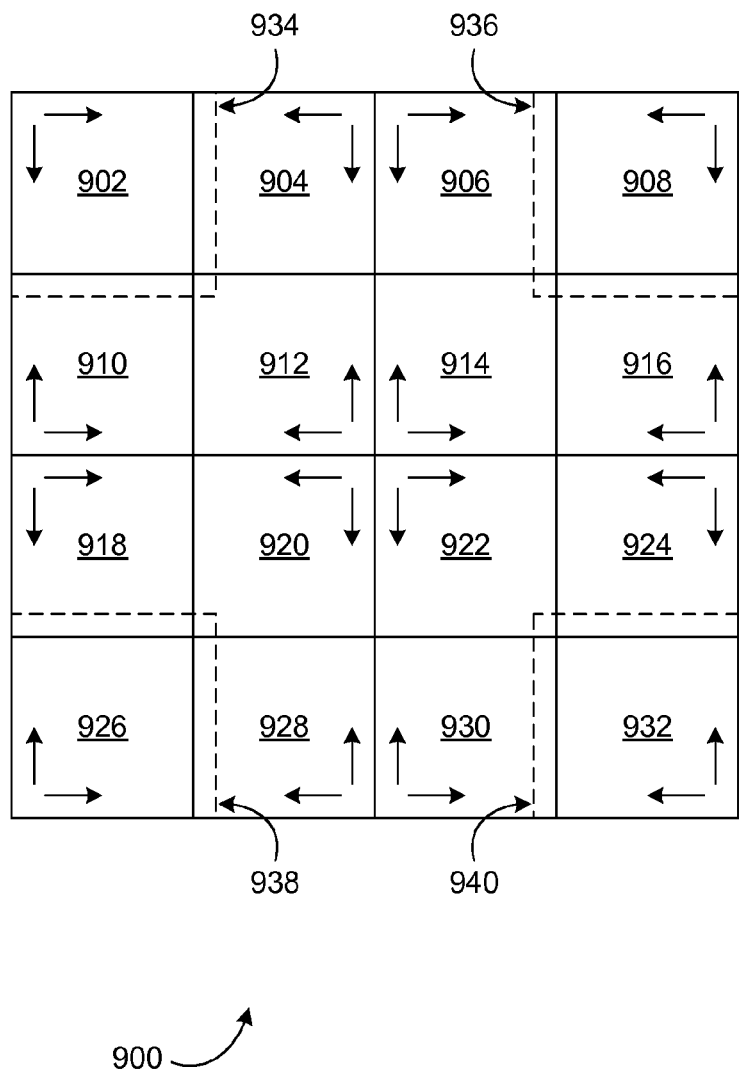
FIG. 9 is a schematic diagram depicting aspects of an example content region partition in accordance with at least one embodiment.

In further describing the steps of FIG. 8, it will be helpful to have reference to an example region partition. FIG. 9 depicts an example partition of a region (or patch) 900 of an image. For example, the region 900 may be one of the determined regions of the images 602 and 702 (FIG. 6 and FIG. 7) such as the regions 606, 608, 610, 612, 708 and 710. The region 900 is partitioned into 16 disjoint sub-regions 902, 904, 906, 908, 910, 912, 914, 916, 918, 920, 922, 924, 926, 928, 930, 932. Although in this example, each sub-region 902-932 has a same size (e.g., includes a same number of pixels such as an 8×8 "mini-patch" of pixels), each embodiment is not so limited.

Each determined region, or type of region, may be associated with a sub-region modification pattern. The sub-region modification pattern may specify how to modify the disjoint set of sub-regions so that the modified sub-regions at least partially overlap. FIG. 9 depicts an example sub-region modification pattern with small arrows inside each depicted sub-region 902-932. For example, the arrows shown inside sub-regions 902, 906, 918 and 922 indicate that the area of the sub-regions 902, 906, 918 and 922 is to be increased by expanding the right edge and bottom edge of the sub-region (from the perspective of FIG. 9). Dashed line 934 indicates a post-modification area of the sub-region 902, which includes an increased number of pixels within the sub-region than the original area of sub-region 902 (pre-expansion). Similarly, the arrows shown inside sub-regions 904, 908, 920 and 924 indicate that the area of sub-regions 904, 908, 920 and 924 are to be increased by expanding the left edge and the bottom edge, respectively. Dashed line 936 indicates a post-modification area of the sub-region 908. The arrows shown inside sub-regions 910, 914, 926 and 930 indicate that the area of sub-regions 910, 914, 926 and 930 are to be increased by expanding the right edge and upper edge, respectively. Dashed line 938 indicates a post-modification area of the sub-region 926. The arrows shown inside sub-regions 912, 916, 928 and 932 indicate that the area of sub-regions 912, 916, 928 and 932 are to be increased by expanding the left edge and upper edges, respectively. Dashed line 940 indicates a post-modification area of the sub-region 932.

In at least one embodiment, expansion of sub-region areas in accordance with the sub-region modification pattern causes at least some of the modified sub-region areas to overlap. For example, the post-modification area 934 of the sub-region 902 overlaps the area of the sub-region 904. That is, the post-modification area 934 of the sub-region 902 includes some of the same pixels as the area of the sub-region 904.

At step 804, a next (e.g., a first) sub-region may be selected. For example, the content descriptor generator 214 (FIG. 2) may select the sub-region 902 (FIG. 9). At step 806, it may be determined whether to expand the selected sub-region. If so, a procedure incorporating step 806 may progress to step 808. Otherwise, the procedure may progress to step 810. For example, the content descriptor generator 214 may determine whether to expand the selected sub-region in accordance with the associated sub-region modification pattern. With respect to the example depicted in FIG. 9, the content descriptor generator 214 would determine that the sub-region 902 is to be expanded. At step 808, the selected sub-region may be expanded. For example, the content descriptor generator 214 may apply an expansion transformation such as a linear or non-linear transformation to the selected sub-region.

At step 810, it may be determined whether to contract the selected sub-region. If so, the procedure may progress to step 812. Otherwise, the procedure may progress to step 814. For example, the content descriptor generator 214 (FIG. 2) may determine whether to contract the selected sub-region in accordance with the associated sub-region modification pattern. The sub-region modification pattern associated with the region 900 of FIG. 9 indicates that none of the sub-regions 902, 904, 906, 908, 910, 912, 914, 916, 918, 920, 922, 924, 926, 928, 930, 932 are to be contracted. At step 812, the selected sub-region may be contracted. For example, the content descriptor generator 214 may apply a contraction transformation such as a linear or non-linear transformation to the selected sub-region.

At step 814, a set of content descriptor components may be determined for the selected sub-region. For example, the content descriptor to be generated may be a vector, and the content descriptor generator 214 (FIG. 2) may determine one or more co-ordinates of the vector based on the selected sub-region. The content descriptor components may correspond to intensity gradients contained in the selected sub-region. For example, the content descriptor generator 214 may generate a pair of content descriptor components for each dimension of the selected sub-region, with one of the pair characterizing positive gradients along the dimension and the other characterizing negative gradients. Content descriptor components in accordance with at least one embodiment are described in Ruzon et al.

At step 816, it may be determined whether there are more sub-regions for which to determine content descriptor components. If so, the procedure may progress to step 804 to select the next sub-region. Otherwise, the procedure may progress to steps not shown in FIG. 8, for example, the procedure may progress to selecting a next region of content to partition and modify. In at least one embodiment, step 814 is performed for each of the sub-regions of the region.

Figure 10:
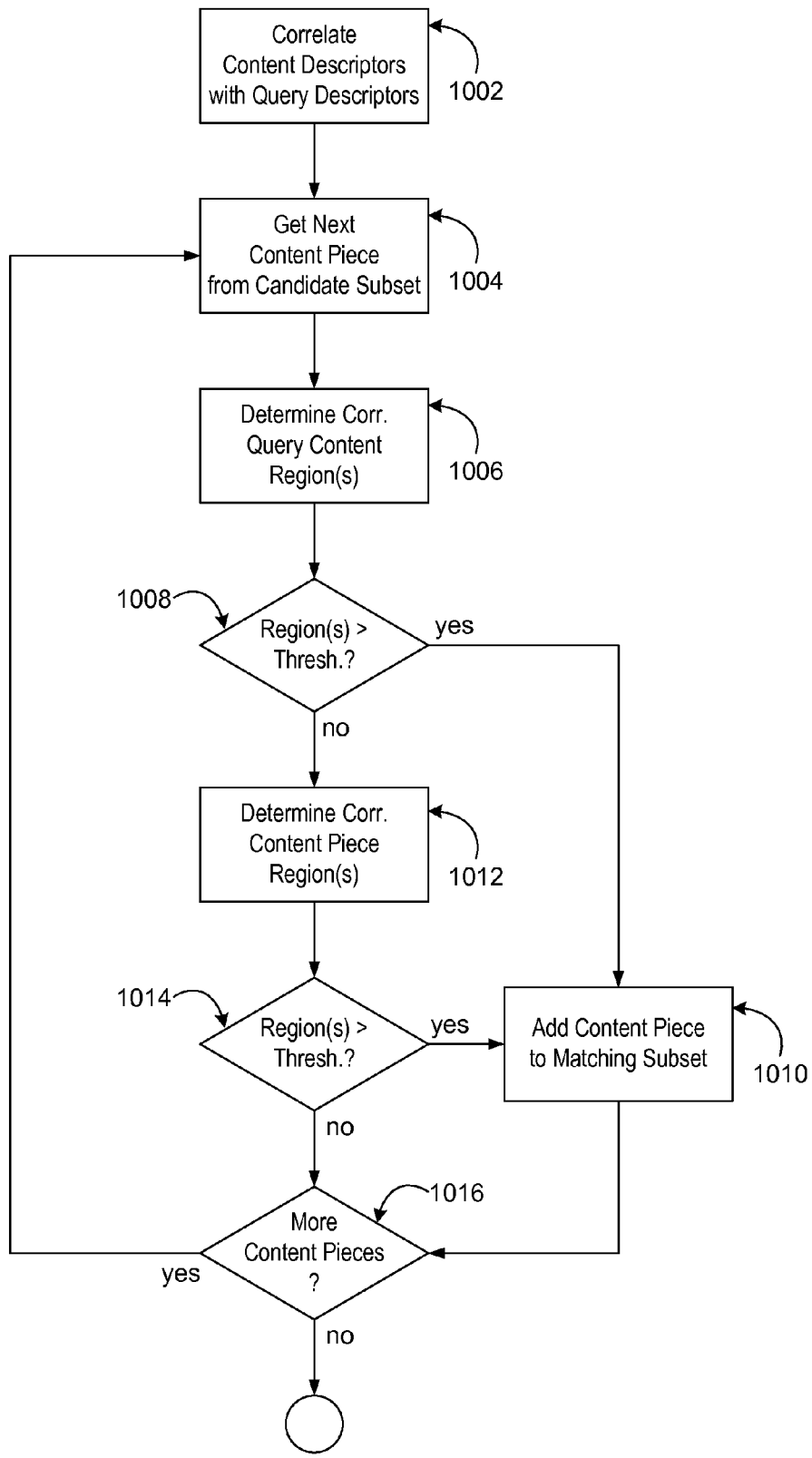
FIG. 10 is a flowchart depicting example steps for determining a matching subset of a content collection in accordance with at least one embodiment.

Having established and/or updated the content descriptor set 210 (FIG. 2), the search module 206 may generate and correlate query descriptors with subsets of the content descriptor set 210 as part of matching query content to content in the content collection 208. FIG. 10 depicts example steps for determining a matching subset of the content collection 208 in accordance with at least one embodiment. At step 1002, a set of query descriptors may be correlated with a subset of the content descriptor set 210. For example, the search module 206 may generate the set of query descriptors characterizing query content with the query descriptor generator 218, and correlate the set of query descriptors with the subset of the content descriptor set 210 utilizing the search index 212. The query descriptor generator 218 may generate query descriptors with a process similar to that described above for content descriptors. The search module 206 may correlate the set of query descriptors and the subset of the content descriptor set 210 with respect to a descriptor space metric, for example, correlation between descriptors may be inversely proportional to a distance between the descriptors in the descriptor space.

At step 1004, a next (e.g., a first) content piece may be selected. For example, the subset of the content descriptor set 210 (FIG. 2) correlated with the set of query descriptors corresponds to a subset of the content collection 208 (a "candidate subset" of the content collection 208). The search module 206 (FIG. 2) may select the next content piece in the candidate subset.

The selected content piece may be associated with a piece subset of the content descriptor set 210 (FIG. 2) correlated with the set of query descriptors at step 1002. The piece subset may be correlated with a subset of the query descriptors. Furthermore, the subset of the query descriptors correlated with the piece subset may correspond to one or more regions of the query content, for example, to the regions of the query content for which the subset of query descriptors were generated as described above with respect to FIG. 5. At step 1006, the region(s) of the query content corresponding to the selected content piece may be determined, for example, by the search module 206. At step 1008, a size of the region(s) of the query content determined at step 1006 may be compared to a region size threshold, for example, by the search module 206. If the size of the region(s) exceeds the region size threshold, a procedure incorporating step 1008 may progress to step 1010. Otherwise, the procedure may progress to step 1012. In at least one embodiment, the size of the region(s) used at step 1008 is a proportionate size and the region size threshold is a proportion threshold (e.g., 10%-50% depending on the type of content). The proportionate size of the region(s) may be determined with respect to a size of the query content as a whole. For example, the query content may correspond to a set of pixels, and the region(s) determined at step 1006 may correspond to a proportion of the set of pixels.

Conversely, the piece subset of the content descriptor set 210 (FIG. 2) correlated with the set of query descriptors at step 1006 also corresponds to one or more regions of the selected content piece. At step 1012, the region(s) of the selected content piece corresponding to the query content may be determined, for example, by the search module 206. At step 1014, a size of the region(s) of the content piece determined at step 1012 may be compared to a region size threshold, for example, the same region size threshold utilized at step 1008. If the size of the region(s) exceeds the region size threshold, the procedure may progress to step 1010. Otherwise, the procedure may progress to step 1016. Again, the size of the region(s) may be a proportionate size, and the region size threshold may be a proportion threshold.

At step 1010, the selected content piece may be added to the matching subset, for example, by the search module 206 (FIG. 2). Accordingly, steps 1008 and 1014 act as matching tests in this example. At step 1016, it may be determined whether there are more content pieces in the candidate subset to test. If so, the procedure may progress to step 1004 to select the next content piece. Otherwise, the procedure may progress to steps not shown in FIG. 10. For example, the steps of FIG. 10 may be incorporated in step 308 of FIG. 3, and the procedure may progress to step 310.

Figure 11:
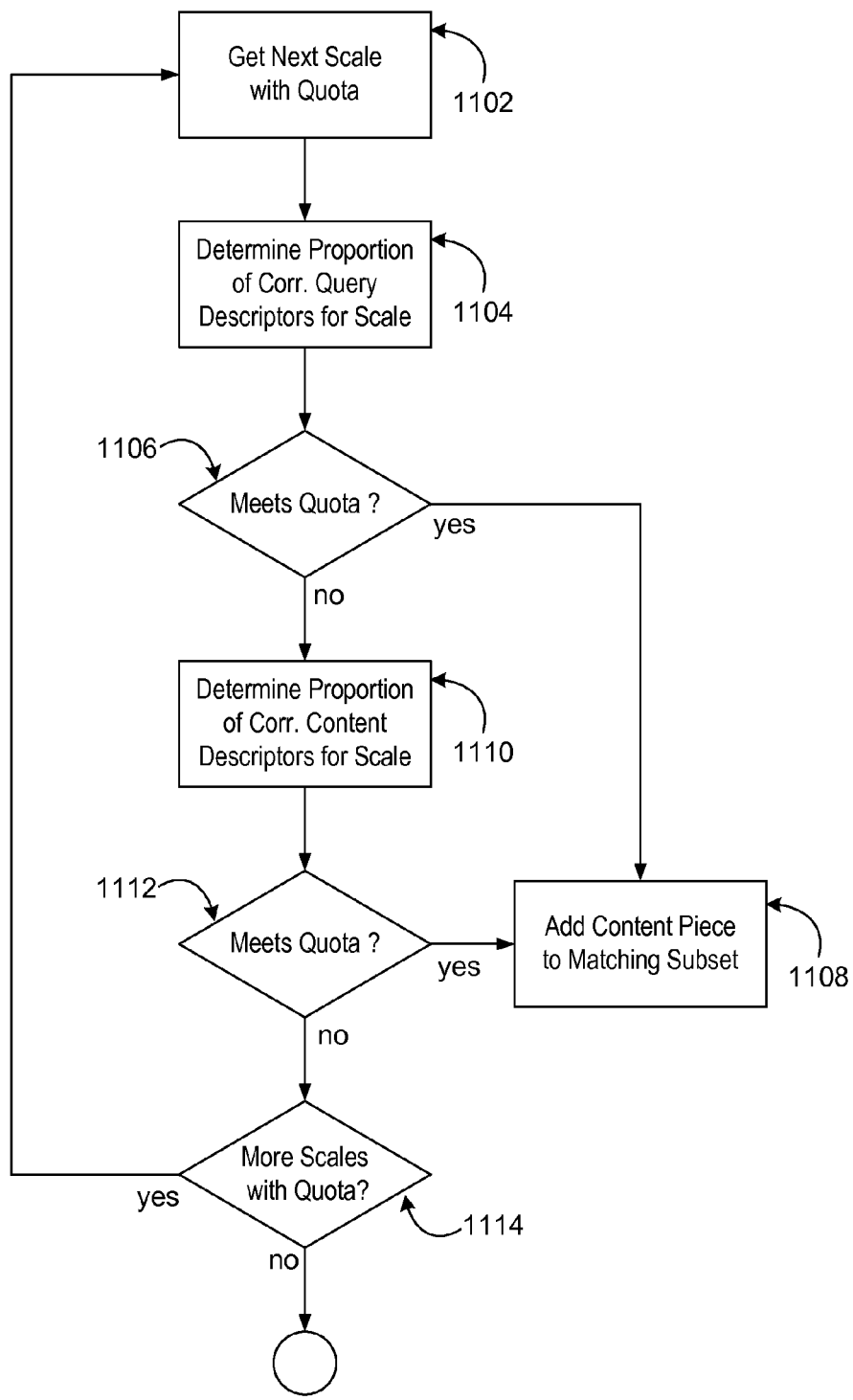
FIG. 11 is a flowchart depicting further example steps for determining the matching subset of the content collection in accordance with at least one embodiment.

Step 1010 may incorporate additional matching tests. For example, the steps depicted in FIG. 11 may be incorporated into step 1010. As described above with reference to FIG. 5, content descriptors may be generated for content at each of a plurality of scales. For example, content descriptors generated for the regions 708 and 710 of FIG. 7 are associated with a larger scale than the content descriptors generated for the regions 606, 608, 610 and 612 of FIG. 6. In at least one embodiment, one or more of the scales has an associated quota (a "scale quota"), and a particular content piece is added to the matching subset when its piece subset of the content descriptor set 210 includes enough content descriptors of each scale to meet the quota. For example, scale quotas may be proportion quotas (e.g., 5%-30% depending on the type of content). At step 1102, a next (e.g., a first) of the scales with quota to be check may be selected. For example, the search module 206 may be configured with a list of scale quotas, and may select the next unchecked scale quota on the list.

At step 1104, a proportion of query descriptors for the scale correlated with the piece subset may be determined. For example, the proportion of query descriptors for the scale may be determined as a ratio of a number of query descriptors for the scale correlated with the piece subset to a total number of query descriptors correlated with the piece subset. At step 1106, it may be determined whether the proportion of query descriptors for the scale determined at step 1104 meets the quota for the scale, for example, by the search module 206 (FIG. 2). If so, a procedure incorporating step 1106 may progress to step 1108. Otherwise, the procedure may progress to step 1110.

At step 1110, a proportion of content descriptors for the scale correlated with the piece subset may be determined. For example, the proportion of content descriptors for the scale may be determined as a ratio of a number of content descriptors for the scale in the piece subset to a total number of content descriptors in the piece subset. At step 1112, it may be determined whether the proportion of content descriptors for the scale determined at step 1110 meets the quota for the scale, for example, by the search module 206 (FIG. 2). If so, the procedure may progress to step 1108. Otherwise, the procedure may progress to step 1114.

At step 1108, the selected content piece may be added to the matching subset, for example, by the search module 206 (FIG. 2). Accordingly, steps 1106 and 1112 act as matching tests in this example. At step 1114, it may be determined whether there are more scale quotas to check. If so, the procedure may progress to step 1102 to select the next scale quota. Otherwise, the procedure may progress to steps not shown in FIG. 11. For example, the steps of FIG. 11 may be incorporated in step 1010 of FIG. 10, and the procedure may progress to step 1016.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for searching a content collection, comprising:
    under control of one or more computer systems configured with executable instructions,
        receiving a search request specifying query content to be matched with content in the content collection, the content collection characterized by a set of content descriptors;
        determining a set of query descriptors for the query content, the query content including one or more regions, the one or more regions including a plurality of sub-regions, at least one of the set of query descriptors associated with query descriptor components corresponding to at least partially overlapping sub-regions of one of the one or more regions that includes an identified feature of the query content;
        identifying a subset of the set of content descriptors that corresponds to at least a portion of the set of query descriptors; and
        providing for presentation at least reference to a subset of the content collection selected based at least in part on the subset of the set of content descriptors.

2. A computer-implemented method according to claim 1, wherein the query content comprises a digitized image, and the query content region is a set of pixels of the digitized image.

3. A computer-implemented method according to claim 1, wherein said at least partially overlapping sub-regions of the query content region include at least one sub-region corresponding to at least one expanded version of a set of disjoint sub-regions that cover the query content region.

4. A computer-implemented method according to claim 3, wherein said at least partially overlapping sub-regions cover the query content region.

5. A computer-implemented method according to claim 1, wherein said at least partially overlapping sub-regions of the query content region include at least one sub-region corresponding to at least one contracted version of a set of disjoint sub-regions that cover the query content region.

6. A computer-implemented method for searching a content collection, comprising:
under control of one or more computer systems configured with executable instructions,
determining a set of content descriptors for the content collection, each content piece in the content collection including one or more regions, the one or more regions including a plurality of sub-regions, at least one of the set of content descriptors associated with content descriptor components corresponding to at least partially overlapping sub-regions of one of the one or more regions of a content piece in the content collection;
determining a set of query descriptors for query content of a search request;
identifying a subset of the set of content descriptors that corresponds to at least a portion of the set of query descriptors; and
providing for presentation at least reference to a subset of the content collection selected based at least in part on the subset of the set of content descriptors.

7. A computer-implemented method according to claim 6, wherein said at least partially overlapping sub-regions cover the region of the content piece.

8. A computer-implemented method according to claim 7, wherein each of the content descriptor components corresponds to one of said at least partially overlapping sub-regions.

9. A computer-implemented method according to claim 8, wherein each of said at least partially overlapping sub-regions corresponds to a plurality of the content descriptor components.

10. A computer-implemented method according to claim 9, wherein the region of the content piece is associated with a plurality of intensity gradients and the plurality of the content descriptor components characterize the plurality of intensity gradients within the corresponding sub-region.

11. A system for searching a content collection, comprising:
at least one device processor; and
memory storing instructions that, when executed by the at least one device processor, causes the system to:
determine a set of content descriptors for the content collection, each content piece in the content collection including one or more regions, the one or more regions including a plurality of sub-regions, at least one of the set of content descriptors being associated with content descriptor components corresponding to at least partially overlapping sub-regions of one of the one or more regions of a content piece in the content collection;
determine a set of query descriptors for query content of a search request;
identify a subset of the set of content descriptors that corresponds to at least a portion of the set of query descriptors; and
provide for presentation at least reference to a subset of the content collection selected based at least in part on the subset of the set of content descriptors.

12. A system according to claim 11, wherein said at least partially overlapping sub-regions cover the region of the content piece.

13. A system according to claim 12, wherein each of the content descriptor components corresponds to one of said at least partially overlapping sub-regions.

14. A system according to claim 13, wherein each of said at least partially overlapping sub-regions corresponds to a plurality of the content descriptor components.

15. A system according to claim 14, wherein the region of the content piece is associated with a plurality of intensity gradients and the plurality of the content descriptor components characterize the plurality of intensity gradients within the corresponding sub-region.

16. A non-transitory computer-readable storage medium including instructions that, when executed by at least one processor of a computing system, cause the computing system to:
determine a set of content descriptors for the content collection, each content piece in the content collection including one or more regions, the one or more regions including a plurality of sub-regions, at least one of the set of content descriptors being associated with content descriptor components corresponding to at least partially overlapping sub-regions of one of the one or more regions of a content piece in the content collection;
determine a set of query descriptors for query content of a search request;
identify a subset of the set of content descriptors that corresponds to at least a portion of the set of query descriptors; and
provide for presentation at least reference to a subset of the content collection selected based at least in part on the subset of the set of content descriptors.

17. A non-transitory computer-readable storage medium according to claim 16, wherein said at least partially overlapping sub-regions cover the region of the content piece.

18. A non-transitory computer-readable storage medium according to claim 17, wherein each of the content descriptor components corresponds to one of said at least partially overlapping sub-regions.

19. A non-transitory computer-readable storage medium according to claim 18, wherein each of said at least partially overlapping sub-regions corresponds to a plurality of the content descriptor components.

20. A non-transitory computer-readable storage medium according to claim 19, wherein the region of the content piece is associated with a plurality of intensity gradients and the plurality of the content descriptor components characterize the plurality of intensity gradients within the corresponding sub-region.

* * * * *